United States Patent Office

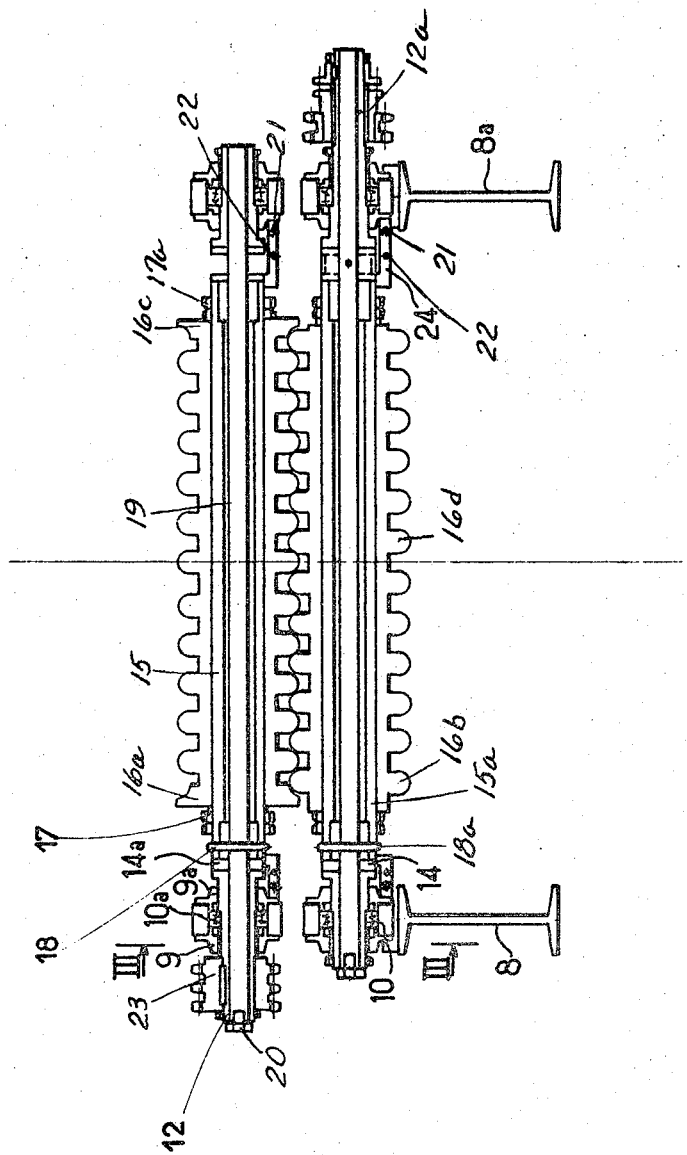

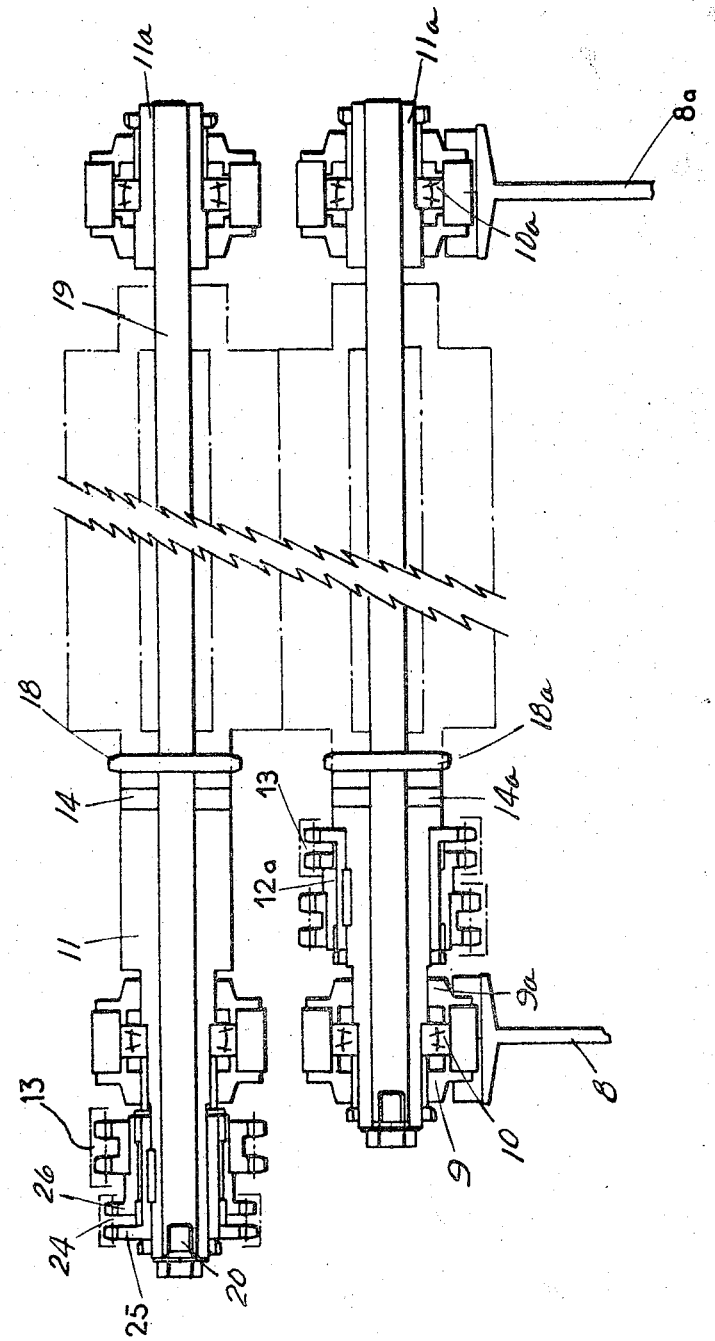

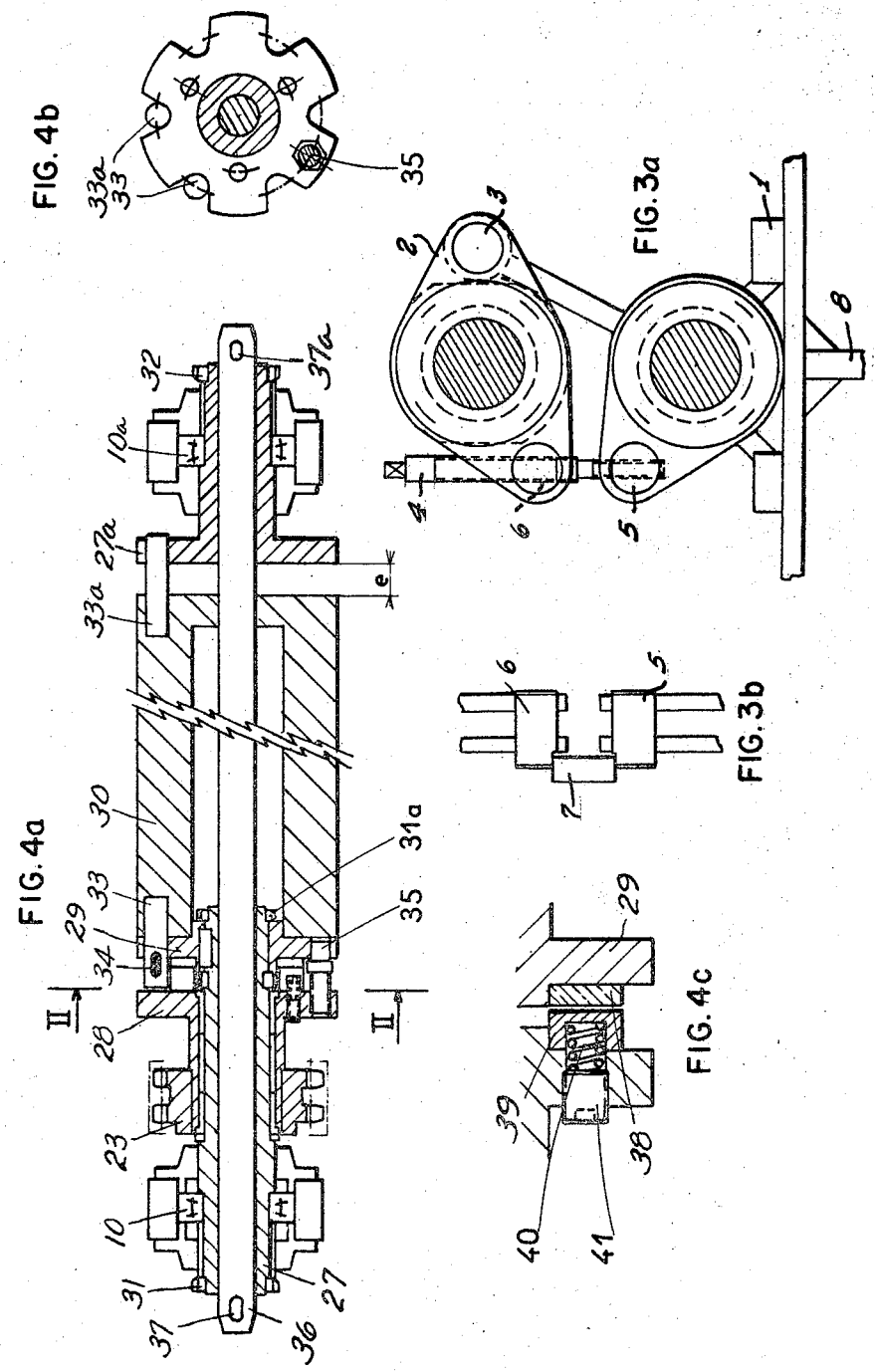

3,435,652
Patented Apr. 1, 1969

3,435,652
MOUNTING OF SHAFTS FOR A MACHINE FOR SHAPING METALLIC BANDS
Lucien Diolot, Neuilly-sur-Seine, France, assignor to Societe Nouvelle Spiden, Paris, France
Filed Feb. 9, 1967, Ser. No. 614,883
Claims priority, application France, Feb. 9, 1966, 49,041
Int. Cl. B21d 5/16; B21b 31/34, 31/08
U.S. Cl. 72—180         11 Claims

ABSTRACT OF THE DISCLOSURE

Mounting of shafts for a machine for profiling metallic bands wherein, at each extremity of a pair of shafts, the bearing block of one of the shafts is articulated on the stationary bearing block of the other shaft; on each shaft the shaping tool for shaping the bands is mounted on a central sleeve between two end sleeves carrying the bearings and the driving pinions with a spindle extending through the three sleeves.

Background of the invention

A machine for shaping metallic bands is generally composed of a series of parallel shafts carrying shaping rollers; the shafts being associated in pairs in a series of spaced vertical planes.

The presently known arrangements of this type have a number of disadvantages and drawbacks and the principal ones are the following: The shafts are each mounted on more than two bearings in line, which is disadvantageous in case of a deformation of the frame whose great dimension renders it difficult to obtain a perfect rigidity. Any change of tools for passing from one profile to another requires a lengthy procedure of disassembly. The mechanical transmission for driving the shafts are complicated and therefore are expensive and susceptible to breakdown. The disconnection or modification of the speed of a shaft at the time when a tool change is needed is difficult.

It is an object of the present invention to provide a mounting arrangement for shafts of band shaping machines wherein the shaping rollers may be changed with little difficulty.

It is another object of the present invention to provide a mounting arrangement of the type described wherein spacing between complementary rollers of a pair is easily and accurately obtainable.

It is another object of the present invention to provide a mounting arrangement of the type described which is simple and economical.

It is a further object of the invention to provide a mounting arrangement of the type described wherein disassociation of the shaping rollers from the driving power is easily effected.

It is the object of the present invention to realize a mounting for a pair of shafts which obviates all of the drawbacks and disadvantages mentioned hereinabove in connection with known arrangements.

Brief description of the invention

The present invention relates to the mounting of shafts for a machine designed for shaping metallic bands which is characterized particularly in that, at each extremity of a pair of shafts, the bearing block of one of the shafts is hingedly connected to the stationary bearing block of the other shaft and the spacing or distance between the two bearings is regulated preferably by a screw thread with a differential pitch preferably engaged with a locking means capable of effecting a predetermined spacing of the bearings by means of a specific wedge for each type of shaping tool, each shaft being mounted on the bearing block thereof by means of a swivel bearing. This type of mounting additionally comprises other characteristics which are part of the present invention and relate to the setting in place of the shaping roller or other implement on each shaft.

These further features and characteristics of the present invention will become apparent in the course of the following description referring to the accompanying drawing which illustrates three exemplary embodiments of the present invention and wherein:

FIGURE 1 is an elevational cross-sectional view through the mounting of a pair of shafts with the driving mechanism at each extremity of the pair;

FIGURE 2 is a modified view of FIGURE 1 with the driving mechanism disposed on only one side of the pair of shafts with means for effecting disconnection thereof;

FIGURE 3a is a transverse cross-sectional view of the bearing arrangements taken along line III—III of FIGURE 1;

FIGURE 3b is the view of a detail of FIGURE 3a;

FIGURE 4a illustrates a modification with the possibilty of disconnection and braking; and FIGURES 4b and 4c are detailed views of portions of FIGURE 4a.

Detailed description of the invention

In order to represent the construction in FIGURES 1 and 2 more clearly, the articulated mounting of the bearings at each extremity of a pair of shafts has not been represented, but FIGURE 3 illustrates clearly how this articulation is realized.

For example, on the left side of FIGURE 1, and as shown in FIGURE 3a, the stationary lower bearing block 1 is supported by an I-shaped beam 8 and is fixedly secured to bearing support plate 9'. The upper bearing support plate 9 is articulated on the bearing support plate 9' or directly on the bearing block 1 by means of a support rib 2 secured to the axle 3. A screw 4 having, for example, differential threads makes it possible to regulate the distance between the two bearings by regulating the spacing between shafts 5 and 6 having a transverse threaded aperture therein in engagement with screw 4. These two shafts 5 and 6 each are provided with a flat locking surface which renders it possible to lock or clamp a specific spacing wedge 7 for each type of shaping tool, which automatically provides the proper spacing of the bearings and eliminates the regulation or adjustment thereof by trial and error, for example, during each change of a profiled tool.

As shown in FIGURES 1 and 2, in each bearing block, for example, the upper left bearing block, there is mounted a roller bearing or a ball bearing 10 and 10a of the swivel type in a manner such as to obtain self-alignment. This bearing is clamped or locked in position by means of two bearing supports 9 and 9a equipped with a fluid-tight system known per se. The bearing is supported by a sleeve 12 upon which the driving pinions 23 are keyed. The same arrangement is found at the right end of the lower shaft in combination with the sleeve 12a.

At the right end of the upper shaft and at the left end of the lower shaft the sleeve 12 or 12a exclusively supports the bearing. Furthermore, each sleeve at the left is traversed by a positioning key or pin 14 or 14a. Mounted on each shaft between the two end sleeves is a shaping roller 15 or 15a, which is constituted of a series of rollers having profile portions 16a, 16b, 16c, and 16d having different shapes and being locked or clamped by nuts and counter nuts 17 and 17a threaded on the sleeve 15 or 15a.

Through the group of sleeves extends a spindle 19 with which it is rendered integral by means of a pin 18 or 18a.

The spindle is locked by a screw 20 at the left extremity.

For the purpose of making it possible to execute without difficulty the successive remounting or reassembly of the combination which is needed for the change of shaping roller 15 or 15a, each inner bearing support, such as 9a and 9a', is provided with a lug portion transverse thereto, and articulated thereon on an axle 21 is a support 24 having a V-shape which may be maintained in the horizontal position for support of roller 15 or 15a by means of a pin 22 extending into the lug portion.

In the case of FIGURE 1, the V-shaped supports 24 are brought into the horizontal position and retained thereat by the pins 22 and the shaping rollers 15 and 15a are placed upon these V's starting with the lower shaft assembly. Each roller and sleeve is placed or applied in a manner such that the key 14 or 14a enters into the corresponding joggle which is provided therefor. Thereafter, each spindle, such as 19 and 19a, is inserted through the shaping roller 15 or 15a and the end sleeve 12 or 12a; and the cylindrical pin 18 and the locking screw 20, which is threaded into each shaft, are next assembled. The end sleeves 12 and 12a carrying the driving pinions are locked by means of the cylindrical pins 18 and 18a to the respective spindles 19 and 19a.

The end and the driving sleeves having been aligned at the time of the initial mounting or assembly of the machine by proper adjustment of the screw 4, the implements will thus always fall back into the same relative position. At the end of the mounting assembly, the pins 22 are removed in order to withdraw the V-shaped supports 24, which are now no longer required for support of the rollers 15 and 15a. The shaping rollers may then be carried along or driven in rotation by means of the chains which come to be engaged with the pinions 23.

The mounting or assembly of shafts according to FIGURE 2 is analogous to the arrangement described above in connection with FIGURE 1, but differs from that of FIGURE 1 firstly in that the drive mechanism is disposed on only one side of the pair of shafts, for example, the left side in the figure. The driving pinions are coupled furthermore to the sleeves 11 in a manner such as to allow at will the disconnection of the shafts in cases where it is desirable that the driving be made only by the product in the course of the shaping.

For this purpose, the coupling or connecting mounting is composed of two parts 25 and 26, mechanically joined for unitary operation by a chain 24. For purposes of disconnection, it suffices to remove the chain 24. As to the chain 13, it may remain mounted permanently, since it assures driving action when the chain 24 is returned into place.

FIGURE 4a shows a modified embodiment which makes it possible to obtain a braking arrangement in the system or a complete disconnection of the elements. For example, the sleeve 27 on the left-hand side is provided with bearings 10 as well as the hub 28 on which are mounted the pinions 23 and the centering plate 29 for the shaping roller 30; the unit which is constituted of all of these elements is locked in position with the aid of the nuts 31 and 31a threaded on the sleeve 27. On the right-hand side, the bearing 10a is mounted on the sleeve 27a and locked thereon by means of the nut 32.

On the driving side, at the left in FIGURE 4a, two spindles 33 (FIGURE 4b) threadedly secured within the roller body and positioned in grooves 29' in the centering plate 29 insure the connection or union of the shaping roller 30 and the plate 29. The unit is laterally secured in position by a key 34. A shouldered screw with projection 35 threaded in plates 28 and 29 assures the connection of the plate 29 with the hub 28. On the right-hand side, two spindles 33a assure in the same manner the positioning and the connection between the sleeve 27a and the shaping roller 30.

The combination of elements 27, 30 and 27a is traversed by a spindle 36 assuring the centering thereof and is longitudinally secured by two keys 37 and 37a.

The provision of the shafts with a given tool takes place in the following manner. First, the spacing between the bearings 1 and 2 is regulated by utilizing a wedge 7 providing the required spacing corresponding to the shaping roller.

With respect to the mounting or assembly of the tools according to FIGURE 4a, it suffices to bring into the upper position two of the grooves 29' existing in the elements 27a and 29 designed for receiving the spindle 33 and 33a. The shaping roller is lowered between the sleeve 27a and the plate 29 and then is mounted so as to be centered on the centering plate 29. A convenient space e must be provided on the side opposite the connection or coupling to the centering plate 29 so as to allow for the lowering of the shaping roller 30 without interference. Once the block has been centered, the positioning key 34 is put in. The spindle 36 assuring the perfect centering of the unit is provided next, and thereafter the keys 37 and 37a are inserted into the spindle.

For purposes of the disassembly, the operations are carried out in the reverse order. This mounting or assembly may be further improved by adding a device which allows for the disconnection of the roller 30. In this case it is sufficient to move back or withdrawn the screw 35 so as to disengage the driving connection thereof with the centering plate 29; thus, the tool can be disconnected from the driving power of the combination in a relatively simple manner.

In addition, the invention contemplates the provision of an adjustable braking system. For this purpose (FIGURE 4c), there is mounted on the plate 29 a friction ring 38 of the type known per se, and mounted on the hub 28 is a metallic ring 39 which is adapted to glide on the centering means thereof. This ring may be pressed more or less firmly upon the friction ring 38 by a plurality of springs 40, the pressure being adjustable by means of the screws 41.

I have shown and described several embodiments in accordance with the present invention. It is understood that the same is not limited thereto but is susceptible of numerous changes and modifications as known to a person skilled in the art and I, therefore, do not wish to be limited to the details shown and described herein, but intend to cover all such changes and modifications as are encompassed by the scope of the appended claims.

I claim:

1. In a machine for shaping metallic bands, a pair of parallel shafts each comprising a central sleeve, a shaping implement mounted on said central sleeve and having an outer profile corresponding to the profile to be given to the metallic bands, a spindle extending through said central sleeve, and two end sleeves each carrying a swivel bearing mounted in a bearing block and positioned on respective ends of said spindle, at each respective end of the pair of parallel shafts the bearing block on one shaft being stationary and the one on the other shaft being articulated on said stationary bearing block, a screw having a differential thread interconnecting the bearing blocks at each respective end of the pair of parallel shafts to provide regulation of the spacing therebetween, a pair of shafts having aligned threaded apertures mounted on respective bearing blocks for engagement with said screw and a wedge being interposed between the shafts engaged by said screw for limiting extent to which the bearing blocks may be moved toward one another, the height of this wedge corresponding to size of the shaping tool being utilized.

2. The combination defined in claim 1 wherein said central sleeve and at least one of said end sleeves are keyed to said spindle.

3. The combination defined in claim 2, wherein each shaft further includes a pinion for driving the shaft mounted on said one of said end sleeves and keyed thereto.

4. The combination defined in claim 3 wherein the pinion on each shaft is located on the same corresponding end of said pair of shafts.

5. The combination defined in claim 3 wherein the pinion on each shaft of a pair of shafts is located on the opposite end of the shafts from the other pinion.

6. The combination defined in claim 1, wherein on each shaft the sleeves and the spindle extending therethrough are bolted at all times in the same relative position by means of a pin and a locking screw for locking the extremity of the spindle.

7. The combination defined in claim 1, wherein each shaft is provided with centering means for centering the central sleeve for facilitating changes of the shaping implement, said centering means including a pair of V-shaped supports articulated on a lug portion of a respective bearing block and being rigidly secured in position by means of a removable pin.

8. The combination defined in claim 7 wherein said centering means further includes a plate integral with each end sleeve adjacent said central sleeve, said central sleeve being secured to said plates by means of spindles, a spacing being provided between the central sleeve and the plate on one end sleeve of each shaft, for purposes of facilitating a change of the shaping implement.

9. The combination defined in claim 8, further including driving pinions mounted on a hub of one end sleeve of each shaft, which hub carries at the side of the plate of the corresponding end sleeve a flange secured to said plate by a threaded connection.

10. The combination defined in claim 9 further including a braking system comprising a friction ring, a pressure spring in contact with said friction ring and a regulating screw urging said spring against said friction ring, interposed between the plate of said one end sleeve and the flange of said hub.

11. The combination defined in claim 8, wherein each end sleeve is locked by means of a nut and said spindle extending through the three sleeves being keyed at the extremities thereof.

References Cited

UNITED STATES PATENTS

| 1,900,722 | 3/1933 | Manske, et al. | 72—180 |
| 2,106,534 | 1/1938 | Parcells | 72—180 |
| 2,159,290 | 5/1939 | Penkala | 72—238 |
| 3,332,270 | 7/1967 | Jordans | 72—238 |

CHARLES W. LANHAM, *Primary Examiner.*

L. A. LARSON, *Assistant Examiner.*

U.S. Cl. X.R.

72—35, 238